Patented July 13, 1943

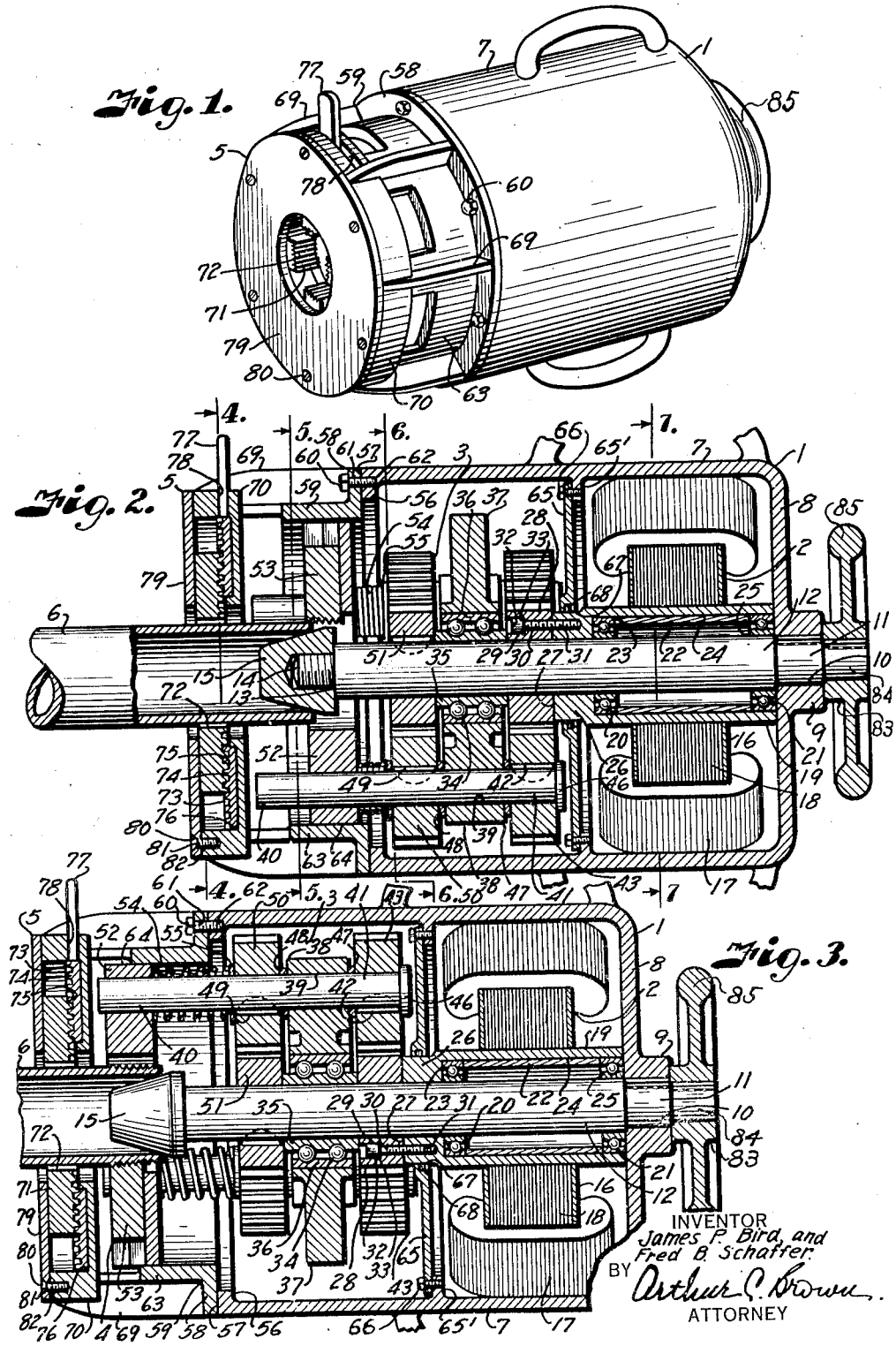

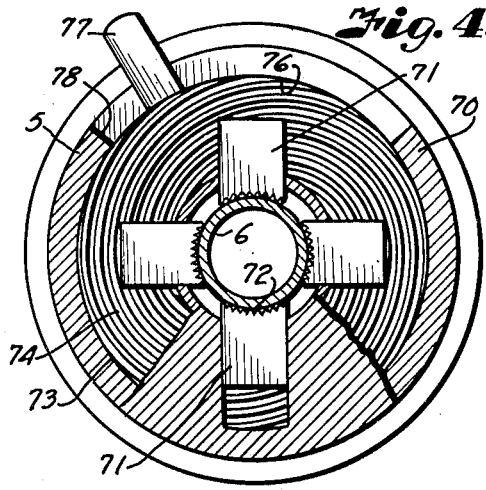
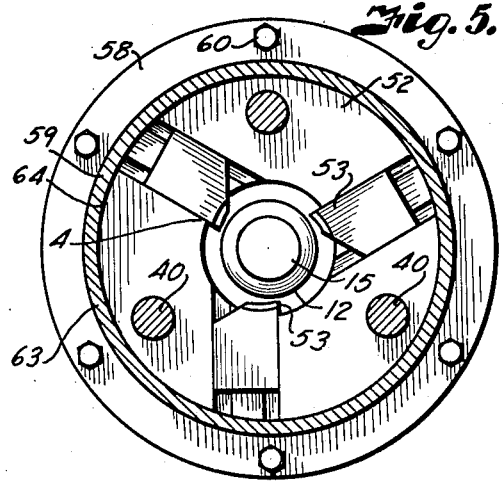
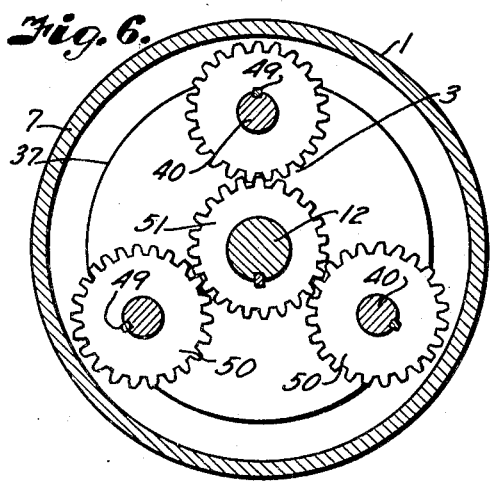
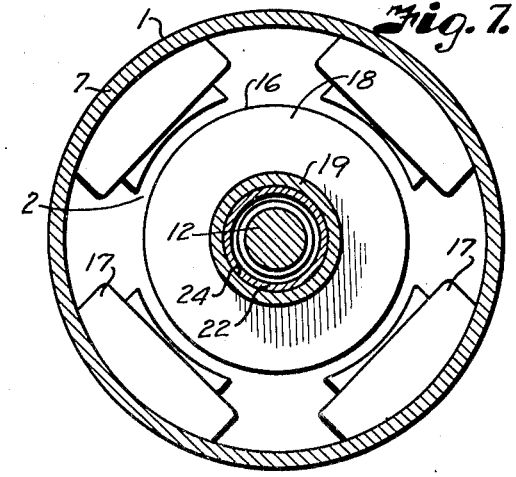
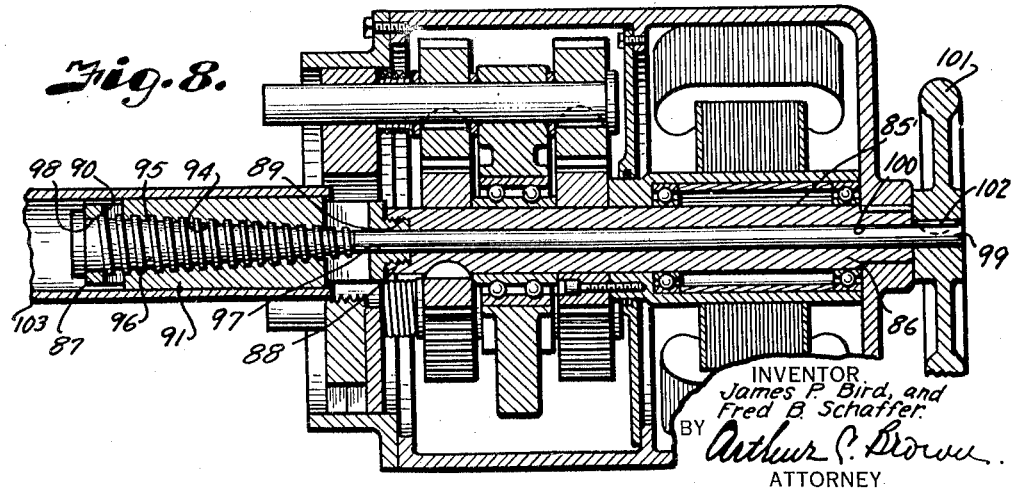

2,323,970

UNITED STATES PATENT OFFICE 2,323,970

THREADING DEVICE

James P. Bird and Fred B. Schaffer,
Kansas City, Mo.

Application June 29, 1942, Serial No. 448,984

13 Claims. (Cl. 10—89)

This invention relates to threading devices and more particularly to a device of that character arranged to grip a tubular member, such as a pipe, and form a thread on the end of the pipe, regardless of the length of the pipe or its inside and outside diameters.

The principal object of the present invention is to provide a pipe threading device capable of accurately, quickly and efficiently chasing threads on the ends of pipe without the necessity of supporting the pipe in a vise or like member.

Other objects of the present invention are to provide a threading device capable of transport to any place where it is necessary to thread pipe and which is capable of threading such pipe without other accessories; to provide a unitary enclosed and self-contained motor driven threading device; to provide for clamping the threading device in desired position relative to the pipe to be threaded and fixing the threading device to the pipe itself; to provide cooperating elements engaging the inside and outside of the pipe to align and clamp said pipe relative to the threading device; to provide for facilitating rotating a thread cutting die in the device relative to the portion of the pipe to be threaded; to provide for normally urging the dies into cutting engagement with the pipe; to provide for rotating the die during longitudinal movement of the die relative to the threading device housing and pipe; to provide for chasing threads on pipes of different diameters with the same thread cutting device; to provide for holding the thread cutting device in alignment with the pipe for facilitating the starting of the thread on said pipe; to provide resilient means for assisting the die members in maintaining the pitch of the thread being cut; to provide for increasing the power normally applied to the thread cutting device during threading operations; to provide an epicyclic gear reduction between the driving means and the thread cutting die; to provide a driving element having a motor armature rotatable about a stationary shaft for driving the threading device; to provide a motor driven threading unit having a motor, gear reduction, threading dies and pipe clamp, all in one housing; and to provide improved elements and arrangements of elements in a thread cutting device of this character.

In accomplishing these and other objects of the present invention, we have provided improved details of structure, the preferred forms of which are illustrated in the accompanying drawings, wherein:

Fig. 1 is a perspective view of a threading device embodying the features of our preferred form of invention.

Fig. 2 is an enlarged vertical, longitudinal section through the threading device illustrated in Fig. 1 showing the device clamped on the pipe to be threaded prior to the threading operation.

Fig. 3 is a section similar to Fig. 2 showing the device secured to a pipe and illustrating the movement of the die member onto the pipe for chasing threads thereon.

Fig. 4 is a transverse irregular section through the pipe clamping member on the line 4—4, Fig. 2.

Fig. 5 is a transverse cross-section through the threading device particularly illustrating the thread cutting die on the line 5—5, Fig. 2.

Fig. 6 is a transverse section through the gear reduction element of the device on the line 6—6, Fig. 2.

Fig. 7 is a transverse section showing the motor driving element of the threading device on the line 7—7, Fig. 2.

Fig. 8 is a vertical longitudinal section through a modified form of threading device, illustrating a mandrel type clamp for clamping the threading device to a pipe to be threaded.

Referring more in detail to the drawings:

The pipe threading device embodying the features of the present invention preferably consists of a housing 1 enclosing a drive mechanism such as a motor 2, a speed reducing gearing 3, and a threading die 4, enclosed in a unitary housing of such size that it may be handled and operated by a single man. Secured to the forward end of the housing is a clamping device 5 for holding and centering the pipe 6 to be threaded relative to the housing and threading device 4. The housing 1 is preferably of cylindrical shape and consists of a peripheral wall 7 and a rear end wall 8, having centrally located therein a boss 9. The boss 9 is provided with a bore 10 adapted to receive the reduced end 11 of a stationary mandrel 12. The opposite end of the mandrel is reduced in size, as at 13, and threaded, as at 14, to receive a frustro-conically shaped guide 15 for engaging the bore of a pipe to be threaded and to assist the clamping member 5 in centering the threading device on the pipe.

Rotatably mounted on the mandrel and adjacent the rear end wall 8 of the housing is an armature 16 adapted to be energized by field coils 17 mounted on the peripheral wall 7 of the housing 1. The armature consists of plates 18 on a hub 19 which is rotatably mounted on spaced bearings 20 and 21. The bearings 20 and 21 are held in spaced relation by a spacer 22 that engages the outer races 23 mounted in the bore 24 of the hub, the inner races 25 being pressed on the mandrel to hold them against rotation.

The hub 19 is provided with a forward extension 26 having a face 27 on which is secured a driving pinion 28, said pinion being secured to the hub by bolts 29 extending through a bore 30 in the pinion and threadedly mounted in threaded apertures 31 of the extension 26. The bolt 29 is provided with a head 32 adapted to be received in a recess 33 in the forward side of the driving pinion.

Mounted on the mandrel, preferably adjacent the driving pinion 28 is an antifriction bearing 34 having an inner race 35 and an outer race 36 rotatably carrying a spider 37 having bosses 38 provided with bores 39 in which are rotatably mounted spindles 40. Mounted on the rearwardly projecting portions 41 of the spindles 40 and keyed thereto by keys 42 are pinions 43 having meshing engagement with the driving pinion 28. It is preferable that the gear speed reduction train be of the epicyclic type. The spindles 40 are preferably provided with heads or collars 46 for holding the pinions 43 thereon, said pinions being spaced from the bosses 38 by washers 47. Mounted on the forward end of the spindles 40, adjacent to and separated from the bosses 38 by washers 48, and keyed to the spindles by keys 49, are pinions 50, the teeth of which have meshing engagement with the teeth of a sun gear 51 keyed to the mandrel 12 adjacent the bearing 34. Slidably mounted on the spindles 40 is a die head 52 having dies 53 of suitable character and adapted to chase the threads of desired size on the pipe 6, the die head being urged forwardly of the spindles 40 by coil springs 54 sleeved over the spindles and having their ends engaging the die head and washers 55 respectively.

The forward end of the housing wall 7 is preferably provided with an inwardly projecting flange 56 forming a face 57 for seating the flange 58 on the clamping member support 59, said support being secured to the housing flange 56 by cap-screws 60 having threaded shanks extending through openings 61 in the flange 58 and threaded into aligned threaded apertures 62 in the housing wall.

Projecting forwardly of the flange 58 is an annular wall 63 adapted to closely engage the peripheral face 64 of the die head 52 to provide support for the die head and the gear train carried in the housing and also to aid in forming a seal to enclose the gear reduction mechanism whereby lubricant may be applied thereto, the rear end of the gear chamber being closed by a plate 65 secured to a flange 65' projecting inwardly from the wall 7 of the housing, said plate 65 being secured on the flange by cap-screws 66. The plate is provided with a bore 67 adapted to closely engage the forward portion of the hub 26 and is provided with a groove for packing 68 to form a grease seal between the gear chamber and the motor chamber in the housing.

Projecting forwardly of the flange 58 are ribs 69 carrying a housing 70 for the pipe clamping members 71, the inner edge of said members being provided with serrated portions 72 adapted to engage the pipe 6. The members 71 are moved into and out of clamping position and adjusted for various sizes of pipes by a plate 73 having spiral teeth 74 on the forward face thereof adapted to engage teeth 75 on the clamping member 71, whereby rotation of the plate 73 in the recess 76 by a handle 77 projecting outwardly through a slot 78 in the housing 70 causes the member 71 to be moved inwardly or outwardly depending upon the direction of rotation of the plate 73.

The clamping member is closed and the elements therein retained in place by a closure plate 79 secured to the housing by screws 80 extending through apertures 81 in the plate and threaded into threaded openings 82 in the housing 70.

In order to assist the operator in holding the threading device, the housing 1 is provided with handling means 83 and the mandrel is provided with a reduced extension 84 on which is keyed a handle 85 whereby the operator may hold the device and assist the clamping member in resisting the torque created by the motor in said housing.

The operation of a threading device constructed as described is as follows:

The size of the pipe to be threaded having been determined, a suitable die adapted to cut the size and character of thread desired is applied to the ends of the spindles 40 and the housing member moved to the left to compress the springs 54 and cause the die to engage the ends of the pipes as illustrated in Fig. 2. The springs 54 are further compressed and the housing moved to the left until the frustro-conical end 15 of the mandrel engages the bore of the pipe to be threaded. The clamping member is sleeved over the pipe during this operation and the lever 77 is moved to cause the clamping member 71 to tightly engage the pipe and cooperate with the frustro-conical member 15 in aligning and holding the threading device on the pipe.

The motor is then actuated, the power of which is transmitted through the armature hub 19, driving pinion 28, to the pinion 43. Rotation of the pinion 43 rotates the spindle 40 which rotates the pinions 50. The rotation of the pinions 50 effects movement of the pinions 50 around the sun gear 51, thus rotating the spider 37 and die head 52 to chase the threads on the pipe. Movement of the spider moves the pinion 43 around the pinion 28 to further reduce the relative speed of the spider and driving pinion. The springs 54 are employed to force the die head toward the pipe to maintain the die in thread-chasing contact with the pipe. It is apparent that the motor is effective in driving the die throughout its thread-chasing action by reason of the motor driving the die head through the gear reduction and the die head being mounted on the spindles in such a manner that said die may move forwardly on the pipe during rotation and said cutting action while the housing and clamp remain stationary to cooperate with the mandrel in holding the mechanism in place.

When suitable threads have been chased on the pipe, the motor is stopped. The direction of rotation of the die head is then reversed or other suitable means used to remove the die from the pipe. The lever 77 is moved from its clamping position to allow the clamping member 71 to release the clamping engagement with the pipe and the entire mechanism, including the mandrel, may then be removed from the pipe as a unit after the pipe is properly threaded. If desired, it is apparent that thread-cutting compounds or other lubricant could be pumped and delivered to said die heads.

In Fig. 8 a modified form of the present invention is illustrated wherein the housing, motor arrangement and gear reduction and die head are substantially similar to that of the preferred form of the invention. The mandrel 85' performs the same function of supporting the motor and gear reduction elements but in the modified form of invention comprises a pair of tubular members 86 and 87 (Fig. 8), the member 87 being engageable with the member 86 in a suitable manner as by a threaded boss 88 on the member 87 engageable in a threaded recess 89 in the forward end of the mandrel member 86. The mandrel member 87 is provided with spaced, longitudinally extending slots 90 of a length and width adapting them for slidably receiving clamping inserts 91. The clamping inserts 91 are each tapered longitudinally from a forward end to a wide rearward end and provided with teeth 94 on their inner edge adapted to engage teeth 95 on a tapered screw 96 mounted in bearings 97 and 98 at the respective ends of the mandrel portion 87. The tapered screw 96 is provided with a rearwardly extending shaft 99 adapted to extend through a bore 100 in the mandrel portion 86 and is adapted to carry a hand wheel 101 secured by a key 102 to the projecting end of the shaft.

The operation of the modified form of invention is substantially similar to that of the preferred form, the difference being that when the threading device is placed in position to thread a pipe 103, the mandrel is inserted in the bore thereof and the housing is moved to the left, Fig. 8, until the threading dies engage the pipe and the springs on the spindles are compressed.

In this form of the invention, the threading device is secured to the bore of the pipe by turning the hand wheel 101 to rotate the tapered screw 96 and move the gripping members 91 longitudinally of the screw and up the taper thereof to force said gripping members into gripping engagement with the bore of the pipe. The die is rotated in substantially the same manner as in the preferred form by the enclosed motor driving the epicyclic gear train which in turn rotates the die to chase the threads.

It is apparent, therefore, that a pipe threading device has been provided by the present invention which avoids the necessity of mounting a pipe to be threaded in a vise or similar support and which thus makes the device available for use in the field or any place in which it is necessary to provide threads on pipe of different sizes.

What we claim and desire to secure by Letters Patent is:

1. In a threading device of the character described, a housing, a clamp on said housing engageable upon a pipe upon which threads are to be chased, said clamp effecting relative support between the pipe and housing, gear reduction means in the housing, a motor for actuating the gear reduction means, a thread-cutting die adjacent the clamp and rotatably supported by the housing having driven engagement with the gear reduction means for effecting rotation of said thread-cutting die, said die being movable longitudinally relative to the housing, and means normally urging the die in a direction toward the pipe.

2. In a device of the character described, a housing, a clamp on said housing engageable upon a pipe upon which threads are to be chased, a motor in the housing, a thread-cutting die, and means including an epicyclic gear train drivingly connecting the motor with the thread-cutting die for effecting rotation of said thread-cutting die.

3. In a device of the character described, a shaft engageable with a pipe upon which threads are to be chased, a driving means carried by said shaft, a housing mounted on the shaft surrounding the driving means, means carried by the housing and engageable with the pipe for clamping the pipe to the housing, and a thread-cutting die connected to the driving means and engageable with the pipe to cut the threads thereon.

4. In a device of the character described, a shaft engageable with a pipe upon which threads are to be chased, means carried by the shaft having engagement with the pipe for clamping said pipe, driving means rotatably mounted on the shaft, and a threading die carried by said driving means and engageable with the pipe to cut the threads thereon.

5. In a device of the character described, a shaft engageable with a pipe upon which threads are to be chased, means carried by the shaft having engagement with the pipe for clamping said pipe, driving means rotatably mounted on the shaft, a threading die carried by said driving means and engageable with the pipe to cut the threads thereon, and means on the driving means normally urging the threading die toward the pipe.

6. In a device of the character described, a shaft engageable with a pipe upon which threads are to be chased, means carried by the shaft having engagement with the pipe for clamping said pipe, a motor, an armature in said motor rotatably mounted on the shaft, an epicyclic gear speed reduction means connected to the armature, and a threading die carried by said speed reduction means and engageable with the pipe to cut the threads thereon.

7. In a device of the character described, a shaft engageable with a pipe upon which threads are to be chased, means on said shaft for centering the pipe, a driving means carried by said shaft, a housing mounted on the shaft surrounding the driving means, means carried by the housing and engageable with the pipe for clamping the pipe to the housing, a gear speed reduction unit connected to the driving means, and a thread-cutting die drivingly connected to the gear speed reduction unit and engageable with the pipe to cut the threads thereon.

8. In a device of the character described, a shaft engageable with a pipe upon which threads are to be chased, means on said shaft for centering the pipe, a driving means carried by said shaft, a housing mounted on the shaft surrounding the driving means, means carried by the housing and engageable with the pipe for clamping the pipe to the housing, a gear speed reduction unit drivingly connected to the driving means, a thread-cutting die drivingly connected to the gear speed reduction unit and engageable with the pipe to cut the threads thereon, and means on the gear reduction unit normally urging the die in a direction toward the pipe.

9. In a device of the character described, a shaft engageable with a pipe upon which threads are to be chased, means carried by the shaft having engagement with the pipe for clamping said pipe, driving means rotatably mounted on the shaft, a speed reduction means connected to said driving means, a threading die carried by said speed reduction means and engageable with the pipe to cut the threads thereon, and means on the speed reduction means normally urging the threading die toward the pipe.

10. In a device of the character described, a shaft engageable with a pipe upon which threads are to be chased, a housing on said shaft, means carried by the housing having engagement with the pipe for clamping said pipe, a motor in the housing, an armature in said motor rotatably mounted on the shaft, an epicyclic gear speed reduction means connected to the motor armature, and a threading die carried by said speed reduction means and engageable with the pipe to cut the threads thereon.

11. In a device of the character described, a mandrel member having a bore therethrough, and having spaced slots therein communicating with the bore, clamping members mounted in said slots, a tapered screw in said bore having threaded engagement with said clamping members, means for rotating said screw to move the clamping members into engagement with the inner surface of the pipe, a die member rotatably mounted on said mandrel member, and means for rotating said die member to chase threads on said pipe.

12. In a device of the character described, a mandrel member having a bore therethrough, and having spaced slots therein communicating with the bore, clamping members mounted in said slots, a tapered screw in said bore having threaded engagement with said clamping members, means for rotating said screw to move the clamping members into engagement with the inner surface of the pipe, a die member rotatably mounted on said mandrel member, a motor on the mandrel, and means including an epicyclic gear train for rotating said die member to chase threads on said pipe.

13. In a device of the character described, a mandrel member having a bore therethrough, and having spaced slots therein communicating with the bore, clamping members mounted in said slots, a tapered screw in said bore having threaded engagement with said clamping members, means for rotating said screw to move the clamping members into engagement with the inner surface of the pipe, a die member rotatably mounted on said mandrel member, a motor on the mandrel, a housing, a motor in the housing, an armature for said motor rotatably mounted on the mandrel, and means including a speed reduction gearing for rotating said die member to chase the threads on said pipe.

JAMES P. BIRD.
FRED B. SCHAFFER.